June 16, 1942.  E. J. ABBE  2,286,249
STEERING MECHANISM
Original Filed May 17, 1940   2 Sheets-Sheet 1
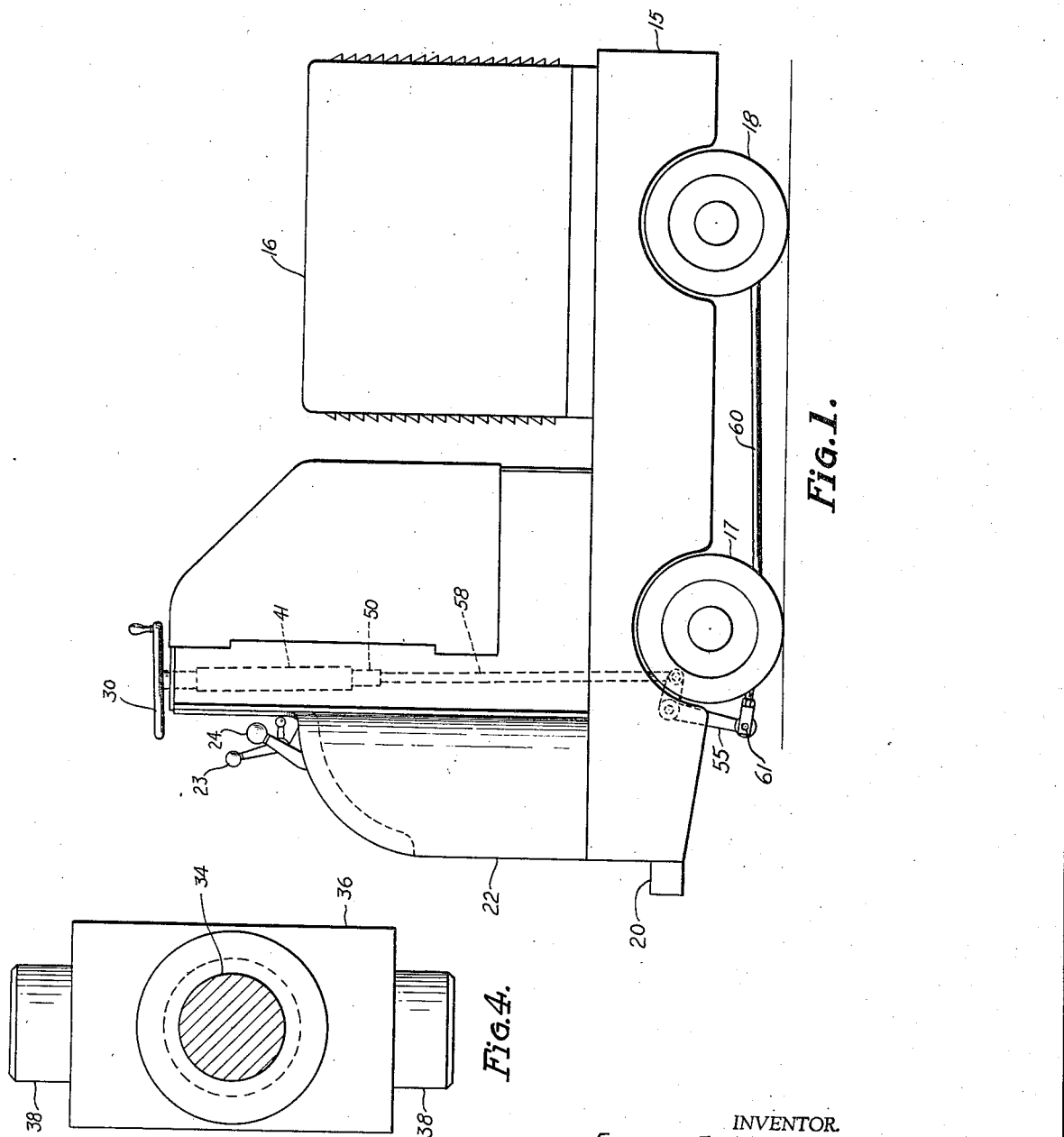
INVENTOR.
EDWARD J. ABBE
BY
Fay, Macklin, Golrick and Williams.
ATTORNEYS.

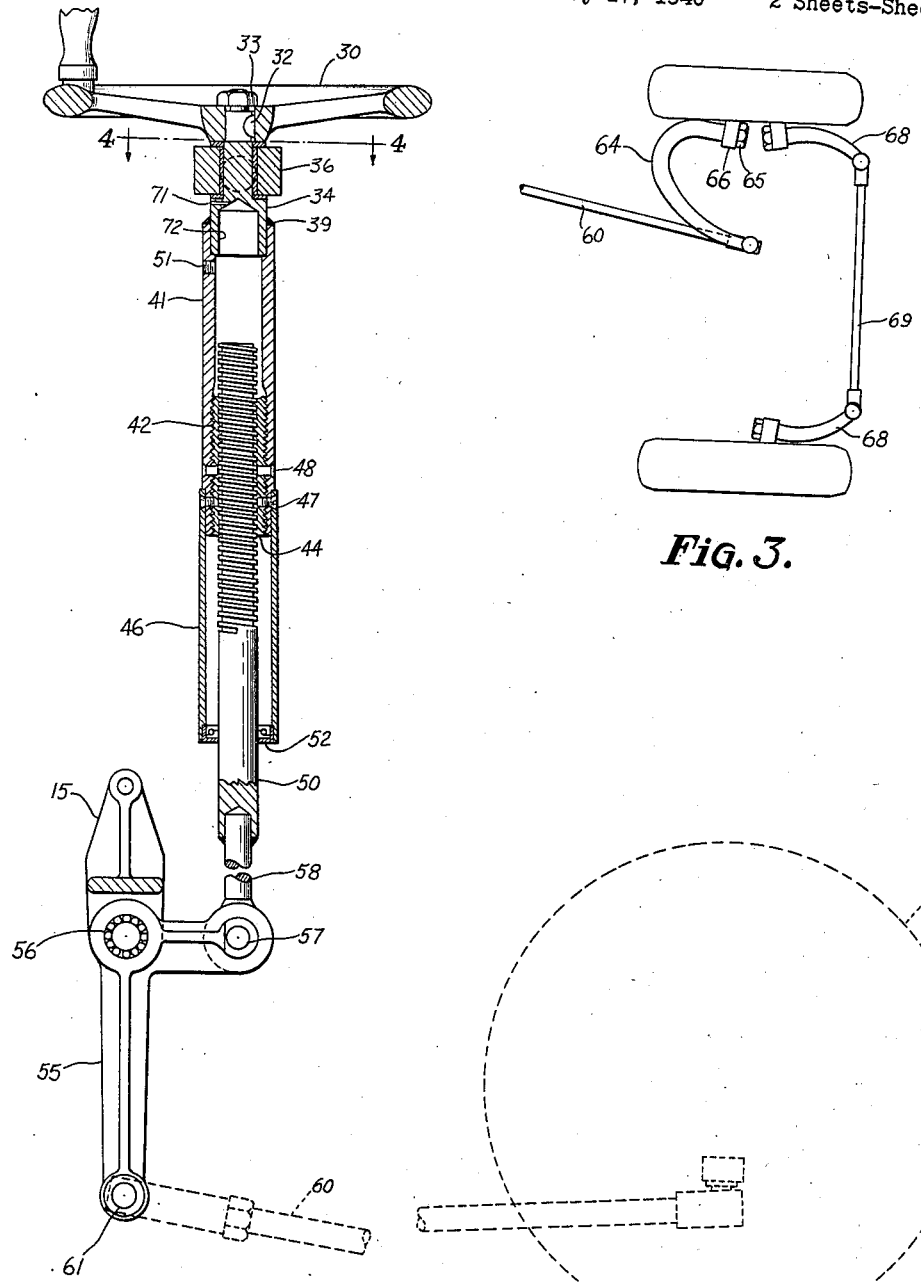

Patented June 16, 1942

2,286,249

UNITED STATES PATENT OFFICE 2,286,249

STEERING MECHANISM

Edward J. Abbe, Cleveland Heights, Ohio, assignor to The Elwell-Parker Electric Company Original application May 17, 1940, Serial No. 335,797. Divided and this application November 16, 1940, Serial No. 365,898

2 Claims. (Cl. 280—96)

This application is a division of my copending application Serial No. 335,797, filed May 17, 1940, for "Winding apparatus."

The present invention relates generally, as indicated, to steering apparatus and has reference more particularly to steering apparatus adapted for use in conjunction with a commercial vehicle, truck or mule. In my above set forth copending application there is disclosed such a vehicle having incorporated therein a rotating device which is adapted for being coupled to and imparting torque to a mechanism. This combination of a truck and rotating device is especially useful for opening and closing the bottom doors or gates of railroad cars and the like.

When such cars are handled in large numbers, it is conventional for the contents thereof to fall directly into a large bin or other temporary container. In order to accomplish this, the cars are positioned on an elevated track over the bin and a cat-walk is provided adjacent the track for accommodating gate opening workmen. Such cat-walks are frequently very narrow and generally have thereon deposits of cargo such as coal and ore, or the like. These deposits, frequently in the nature of lumps, serve as obstructions upon which the workmen slip or over which the workmen stumble and consequently it will be readily appreciated that operation on such cat-walks of an ordinary vehicle is even more hazardous. The vehicle, during the course of its travel, might be upset or swerve off of the cat-walk by engagement of the steered wheels thereof with such lumps, and the vehicle and the operator thereof would be seriously injured due to the elevation of the cat-walk. However, if the steering mechanism were non-responsive to jolts of the steered wheels or if it were self-locking, then the possibility of accidental running off of the cat-walk would be materially reduced.

The primary object of this invention has been to provide a self-locking steering mechanism adapted for use in conjunction with vehicles of the type above identified. Another and further object of this invention has been to provide mechanism as above set forth which is mechanically simple and which is economical to produce.

To the accomplishment of the foregoing and related ends, said invention, then, consists of the means hereinafter fully described and particularly pointed out in the claims; the annexed drawings and the following description setting forth in detail certain means and one mode of carrying out the invention, such disclosed means and mode illustrating, however, but one way in which the principle of the invention may be used.

In said annexed drawings—

Fig. 1 is a side elevation of a vehicle having incorporated therein the principal features of this invention;

Figs. 2 and 3 are more or less diagrammatical views of the steering mechanism seen in Fig. 1; and Fig. 4 is an enlarged section taken on the line 4—4 of Fig. 2.

I will describe my invention in conjunction with a vehicle, in the nature of an industrial mule, but it will be understood that the latter is purely illustrative and is not by way of limitation, the invention being adapted for use in conjunction with many other types of vehicles. With reference now more particularly to Fig. 1, I will identify sufficient elements of the industrial mule seen therein to provide a proper background for a clear understanding of this invention.

The industrial mule in general comprises a heavy frame 15 upon which is mounted within a hood 16, a suitable source of power, such as a motor-generator set, for propelling the rear wheels 17. Front wheels 18 are adapted to be steered and are controlled by the steering mechanism which is set forth in the remaining figures and which will be hereinafter more fully described. For supporting the operator of the mule, a platform 20 is provided and for guarding and protecting the operator a plate 22 is provided. Suitable means, such as levers 23 and 24, may be provided on a control panel for controlling the speed and direction of the mule and also for controlling the rotating device heretofore referred to.

The self-locking steering mechanism will now be described in detail and is controlled by a steering wheel 30 which is preferably horizontally disposed in advance of the control panel. Suitably non-rotatably connected to the steering wheel as by means of a key 32 and a nut 33 is a stub shaft 34 which is journalled in a block 36. This block is better seen in Fig. 4 and comprises a body portion from which projects a pair of pivot arms 38 which are supported by the frame of the mule immediately below the steering wheel for pivotal movement about an axis which is horizontal and which is transversely disclosed or perpendicular to Fig. 1.

The lower end of this stub shaft projects within and is welded as at 39, or otherwise suitably non-rotatably secured, to a tube 41. This tube is provided with interior threads 42, which engage an exteriorly threaded nut 44 which, along with tube 41, projects within and is non-rotatably secured to a sleeve 46 by suitable means such as screws 47, rivets 48 being provided for further securing the tube to the nut. Projecting within the tube and the nut is a threaded non-rotatable shaft 50, the threads of which engage interior threads of the nut.

For the admission of a lubricant for lubricating the threads, a threaded opening 51, adapted to be suitably plugged, is provided in the upper portion of the tube, and sealing means 52 are provided for preventing loss of such lubricant.

For translating the vertical movement of the shaft 50 to horizontal movement, the same actuates a bell crank 55 which is journalled to the frame 15 by means of anti-friction bearing 56, the axis of which is parallel to the axis about which the block 36 pivots. One arm of the bell crank is pivotally connected, as at 57, to a stub shaft 58 which is suitably secured, as by welding, to the shaft 50. A steering reach 60 is pivotally connected to the other arm of the bell crank, as at 61, and extends therefrom below the axle of the wheels 17 forwardly to the front or steered wheels 18 where it is pivotally connected to a steering knuckle 64. The latter is suitably secured as by a nut 65 to a suitable portion 66 of one of the front axles. For interconnecting the front axles, each of them has connected thereto by elements similar to the elements 65 and 66 a link 68, the links being pivotally interconnected by means of a radius rod 69.

From the foregoing it will be seen that rotation of the steering wheel 30 rotates the sleeve 44 about the shaft 50, thus this shaft is raised or lowered with respect to the block 36 or frame 15 and by means of the bell crank pushes or pulls the steering means and manipulates the individual front axles. It will also be seen that jars or impacts imparted to the steering knuckles by means of the front wheels coming in contact with lumps of the character above described will not be transmitted as effective rotational energy to the steering wheel and cause the mule to swerve off of the cat-walk. In other words, the steering mechanism can be appropriately called self-locking or irreversible. It will be further seen that as the shaft 50 is actuated, the volume within the tube will vary. For accommodating this variation, a vent 71 is provided in the stub shaft 34 and communicates with the interior of the tube by means of an axial bore 72.

Attention is directed to two important instant centers of the steering column. One of the instant centers of the steering column with respect to the frames 15 is stationary and is the axis of the pivot arm 38 of the block 36. The instant center of the steering column with respect to the bell crank 55 is at 57. Thus when the steering wheel 30 is actuated the whole steering column simultaneously pivots about the bell crank and also about the frame.

Other modes of applying the principle of my invention may be employed instead of the one explained, change being made as regards the means and the steps herein disclosed, provided those stated by any of the following claims or their equivalent be employed.

I therefore particularly point out and distinctly claim as my invention:

1. The combination of a vehicle, and means for steering said vehicle, said means comprising a block pivotally carried by said vehicle, a stub shaft rotatably journaled in said block, an interiorly threaded tubular element one end of which is adapted for projecting over one end of said stub shaft, said ends being drivingly secured together, a threaded shaft adapted for engaging said interior threads, a lever pivotally carried by said vehicle, said threaded shaft and said lever being pivotally connected, a wheel for steering said vehicle, and means interconnecting said lever and said wheel whereby rotation of said stub shaft steers said vehicle.

2. The combination of a vehicle having supporting wheels, one of which is adapted to be steered, a steering wheel, a block pivotally carried by said vehicle, a steering column rotatably carried by said block and comprising a tubular portion connected to said steering wheel and a portion having threads connected to said tubular portion and movable relatively to the latter, said tubular portion entirely enclosing said threads, a lever pivotally carried by said vehicle and adapted for pivotal movement about an axis which is parallel to the axis about which said block pivots, and a steering reach pivotally connected to said lever and to said steerable wheel, said last-named portion of the steering column being connected to said lever.

EDWARD J. ABBE.